United States Patent [19]
Bratt

[11] 3,855,402

[45] Dec. 17, 1974

[54] PROCESS FOR PRODUCTION OF TRIBASIC LEAD SULPHATE MONOHYDRATE

[75] Inventor: Geoffrey Charles Bratt, West Moonah, Tasmania, Australia

[73] Assignee: Electrolytic Zinc Company of Australasia Limited, Melbourne, Victoria, Australia

[22] Filed: Oct. 8, 1971

[21] Appl. No.: 187,809

[30] Foreign Application Priority Data
Oct. 12, 1970  Australia............................ 2824/70

[52] U.S. Cl...................... 423/559, 423/89, 413/92
[51] Int. Cl............................................. C01g 21/20
[58] Field of Search...................... 423/559, 89, 92

[56] References Cited
UNITED STATES PATENTS

| | | | |
|---|---|---|---|
| 2,249,330 | 7/1941 | Stewart............................... | 423/559 |
| 3,128,247 | 4/1964 | Cohen et al. .................... | 423/559 X |
| 3,440,155 | 4/1969 | Pickering et al................. | 423/92 X |
| 3,552,916 | 1/1971 | White et al. ........................ | 423/559 |

OTHER PUBLICATIONS

J. W. Mellor's book, "A Comprehensive Treatise on Inorganic and Theoretical Chemistry," Vol. 7, page 813, Longmans, Green & Co., New York.

*Primary Examiner*—Edward Stern
*Attorney, Agent, or Firm*—Waters, Roditi, Schwartz & Nissen

[57] ABSTRACT

Preparation of basic sulphates of lead including tribasic lead sulphate monohydrate and two novel compounds, namely a basic lead ammonium sulphate (designated $\beta$ compound) and a poorly crystalline anhydrous dibasic lead sulphate (designated $\gamma$ compound) obtainable from $\beta$ compound; includes a step in which a starting material selected from one or more of the group consisting of lead sulphate, lead ammonium sulphate, lead monoxide, monobasic lead sulphate, tetrabasic lead sulphate, crystalline dibasic lead sulphate, and $\beta$ compound as hereinbefore defined is treated with a reagent selected from the group consisting of aqueous ammonia, mixtures of aqueous ammonia and solid ammonium sulphate, solutions of ammonium sulphate or slurries of ammonium sulphate, the starting material and the reagent being appropriately chosen according to the desired product.

3 Claims, No Drawings

PROCESS FOR PRODUCTION OF TRIBASIC LEAD SULPHATE MONOHYDRATE

This invention relates to the preparation of basic sulphates of lead, and includes two novel compounds of lead.

The first novel compound is related to dibasic lead sulphate and has the approximate composition 2.8 PbO [PbSO$_4$. 0.4 (NH$_4$)$_2$SO$_4$ ] H$_2$O.

This compound is referred to herein as $\beta$-compound.

If the $\beta$ compound is heated to temperatures above 100°C both water and ammonia are evolved and the product is a poorly crystalline anhydrous dibasic lead sulphate, hereinafter referred to as the $\gamma$ compound, which may contain traces of monobasic lead sulphate. The $\gamma$ compound is also novel.

The invention also provides a process for the manufacture of basic sulphates of lead selected from the group consisting of tribasic lead sulphate monohydrate, anhydrous tribasic lead sulphate, $\beta$ compound as hereinbefore defined, and $\gamma$ compound as hereinbefore defined, characterized by including a step in which a starting material selected from one or more of the group consisting of lead sulphate, lead ammonium sulphate, lead monoxide, monobasic lead sulphate, tetrabasic lead sulphate, crystalline dibasic lead sulphate, and $\beta$ compound as hereinbefore defined is treated with a reagent selected from the group consisting of aqueous ammonia, mixtures of aqueous ammonia and solid ammonium sulphate, solutions containing ammonia and ammonium sulphate, solutions of ammonium sulphate or slurries of ammonium sulphate, the starting material and the reagent being appropriately chosen according to the desired product.

Some of the starting materials may suitably be obtained by known methods from lead bearing ores, concentrates, residues, dusts etc.

In our U.S. Pat. No. 3,440,155 methods of preparation are disclosed for substantially pure monobasic lead sulphate and lead sulphate from such raw materials as ores, concentrates etc.

Further, in our U.S. Pat. No. 3,620,670, methods of preparation are disclosed for substantially pure monobasic lead sulphate, lead ammonium sulphate and lead sulphate or mixtures of monobasic lead sulphate and lead ammonium sulphate from raw materials such as ores, concentrates etc.

The selected reactants which are capable of being used in accordance with the present invention include aqueous ammonia, mixtures of aqueous ammonia and solid ammonium sulphate, solutions containing ammonia and ammonium sulphate or solutions or slurries of ammonium sulphate.

The reactant which is used is determined by the material being treated as indicated by Tables 1 and 2 below.

Throughout this specification, the following abbreviations are used:

| | |
|---|---|
| ml | = milliliter |
| g | = gram |
| g/l | = grams per liter |
| aq. | = aqueous |
| min. amt | = minimum amount |
| sec | = second |
| XRD | = X-ray diffraction |
| T/NH$_3$ | = total ammonia |
| T/SO$_4$ | = total sulphate. |

TABLE 1

SELECTED REACTANTS FOR PRODUCTION OF TRIBASIC LEAD SULPHATE MONOHYDRATE

| Material treated | Min. Amt. (mls) of 35% aq. ammonia required/g of material | Min. Amt. (g) of ammonium sulphate required/g of material |
|---|---|---|
| Lead sulphate | 0.24 | nil |
| Lead ammonium sulphate | 0.168 | nil |
| $\beta$ compound | 0.102 | nil |
| Monobasic lead sulphate | 0.093 | nil |
| Dibasic lead sulphate | 0.033 | nil |
| Tetrabasic lead sulphate | nil | 0.0263 |
| Lead oxide | nil | 0.132 |

TABLE 2

SELECTED REACTANTS FOR PRODUCTION OF $\beta$ COMPOUND

| Material treated | Min. Amt(mls) of 35% aqueous ammonia required/g of material | Min. Amt(g) of ammonium sulphate required/g of material |
|---|---|---|
| Lead sulphate | .085 | nil |
| Lead ammonium sulphate | .059 | nil |
| Monobasic lead sulphate | .092 | nil |
| Dibasic lead sulphate | nil | .0195 |
| Tetrabasic lead sulphate | nil | .089 |
| Lead oxide | nil | .224 |

When materials such as lead sulphate, lead ammonium sulphate, monobasic lead sulphate, dibasic lead sulphate or $\beta$ compound are being converted to tribasic lead sulphate monohydrate the selected reactant may be pure or substantially pure aqueous ammonia. However, after reaction the solution will contain ammonium sulphate in amounts determined by the starting material. Such solutions after suitable addition of aqueous ammonia and possibly removal of some ammonium sulphate may be suitable for reuse in the production of further quantities of tribasic lead sulphate.

Similarly when materials such as tetrabasic lead sulphate and lead monoxide are to be converted to tribasic lead sulphate monohydrate the selected reactant may be pure or substantially pure ammonium sulphate as a solution or as a slurry. However, after reaction the solution will contain free ammonia in amounts determined by the starting material. Such solutions after suitable addition of ammonium sulphate and possibly removal of some ammonia may be suitable for re-use in the production of further quantities of tribasic lead sulphate. It has been found advantageous to have some ammonia present in the selected reactant in order to accelerate the conversion of such compounds.

Similar considerations apply to the solutions resulting from the production of the $\beta$ compound.

The minimum amounts of ammonia or ammonium sulphate required to treat mixtures of the compounds listed in Tables 1 and 2 may be readily determined from the composition of the mixture and the data of Tables 1 and 2.

Tribasic lead sulphate can exist as a monohydrate, hereinafter termed the monohydrate, and in an anhydrous form. Both forms, but particularly the latter, find wide use as a stabilizer for halogen containing plastics such as poly-vinyl chloride and many methods of manufacture have been devised.

The monohydrate may be converted to the anhydrous state by such procedures as thermal dehydration or by azeotrope formation.

The β compound may be readily decomposed by heating to yield the γ compound, which, because of its basic character and near amorphous state, may also be useful as a stabilizer for plastics.

The present invention provides a method of converting a range of lead compounds to useful basic lead sulphates which is simpler, cheaper and more efficient than existing procedures. This novel procedure has also the advantage of being compatible with the processing procedures for ores etc. disclosed in our U.S. Pats. Nos. 3,440,155 and 3,620,670.

In a preferred embodiment of the invention there is provided a process for the production of tribasic lead sulphate monohydrate characterized by including a step in which a starting material selected from one or more of the group consisting of lead sulphate, lead ammonium sulphate, lead monoxide, monobasic lead sulphate, tetrabasic lead sulphate, crystalline dibasic lead sulphate, and β compound as hereinbefore defined is treated with a reagent selected from the group consisting of aqueous ammonia, mixtures of aqueous ammonia and solid ammonium sulphate, solutions containing ammonia and ammonium sulphate, solutions of ammonium sulphate or slurries of ammonium sulphate.

The monohydrate so obtained may be converted to the anhydrous state by such procedures as thermal dehydration or by azeotrope formation.

In a further preferred embodiment of the invention there is provided a process for the production of β compound as hereinbefore defined characterized by including a step in which a starting material selected from one or more of the group consisting of lead sulphate, lead ammonium sulphate, lead monoxide, monobasic lead sulphate, tetrabasic lead sulphate and crystalline dibasic lead sulphate is treated with a reagent selected from the group consisting of aqueous ammonia, mixtures of aqueous ammonia and solid ammonium sulphate, solutions containing ammonia and ammonium sulphate, solutions of ammonium sulphate or slurries of ammonium sulphate.

In a further preferred embodiment of the invention there is provided a process for the manufacture of the γ compound which includes the steps of treatment of materials chosen from the group lead sulphate, lead ammonium sulphate, monobasic lead sulphate, dibasic lead sulphate or mixtures of these compounds with aqueous ammonia and the subsequent thermal decomposition of the solid product.

In a further embodiment of the invention there is provided a process for the manufacture of the γ compound which includes the steps of treatment of materials chosen from the group lead monoxide, tetrabasic lead sulphate or mixtures of these compounds with a mixture of aqueous ammonia and ammonium sulphate and the subsequent thermal decomposition of the solid product.

By use of the procedures mentioned hereinabove, basic lead sulphates may be readily prepared from a range of lead compounds by treatment with aqueous ammonia or with selected mixtures of aqueous ammonia and ammonium sulphate.

Preparation of other basic lead compounds, for example, the basic chlorides, can be achieved by treatment of other lead compounds by the use of selected mixtures of aqueous ammonia and ammonium chloride.

The aqueous ammonia may be added as such to the reaction mixture or may be prepared in situ from gaseous ammonia and water. Provided that at least the minimum amounts as defined in Tables 1 and 2 are supplied the amount of ammonia required is determined by economic considerations of disposal of excess and the speed of reaction required. The concentration of aqueous ammonia employed should be as high as it is consistent with the rheological properties of the pulp formed in the reaction vessel.

Ammonium sulphate may be added as such to the reaction mixture or prepared in situ from aqueous ammonia and sulphuric acid. The amounts used should be kept close to the minimum amounts set out in Tables 1 and 2. The concentration of ammonium sulphate in the reaction mixture will be determined by the amount and concentration of aqueous ammonia and the raw material employed.

The reaction may be carried out at temperatures in the range ambient to 200° but to avoid the use of pressure vessels and excessive loss of ammonia it is preferably carried out in the range ambient to 40°C.

Agitation may be by any convenient means but is preferably provided in such a way as to permit control of particle size of the product, and should be adjusted in duration to permit complete reaction and a suitable particle size of product. Preferably the agitation should be provided for 0.25 to 5 hours.

From the foregoing description it will be understood that this process may be readily operated either as a batch or as a continuous operation. This invention is illustrated but not limited by the following examples.

EXAMPLE 1

40 g of lead sulphate was mixed with 50 ml of 0.880 aqueous ammonia solution and 250 ml of water for 3 days in a laboratory tumbling mill. Complete conversion of the lead sulphate to tribasic lead sulphate monohydrate was effected and the resulting solution composition was

| Pb | <0.2 g/l |
| T/NH$_3$ | 44 g/l |
| T/SO$_4$ | 310 g/l. |

EXAMPLE 2

10 g of lead sulphate was mixed with 600 ml of 0.880 ammonium hydroxide solution and 300 ml of water and shaken by hand for 20 secs. Complete conversion to tribasic lead sulphate monohydrate occurred.

EXAMPLE 3

A sample of tribasic lead sulphate monohydrate prepared by the procedure of Example 1 was heated to 215°C for 4 hours. A weight loss of 1.91% occurred and the product was demonstrated by analysis and XRD procedures to be anhydrous tribasic lead sulphate.

EXAMPLE 4

40 g of lead sulphate was treated with 60 ml 0.880 NH$_3$, 33 ml H$_2$O and 22 g ammonium sulphate for 30 secs by hand shaking and the white solid product was filtered off and shown to be pure β compound by XRD. The major lines were (A.) 3.80, 8.15, 6.71.

EXAMPLE 5

A sample of β compound prepared by the procedure of Example 4 was heated to 120°C for 1 hour with a loss in weight of 3.95%. The product was a white solid. Analysis showed that the product contained <0.05% $NH_3$ and XRD evidence (line broadening and absence of lines) indicated that it was a poorly crystalline dibasic lead sulphate with traces of monobasic lead sulphate.

EXAMPLE 6

10 g of monobasic lead sulphate was treated with 100 ml of 0.890 aqueous ammonia for 2 hours by hand shaking. The product was substantially pure tribasic lead sulphate monohydrate.

EXAMPLE 7

10 g of lead ammonium sulphate was treated with 100 ml of 0.890 aqueous ammonia for 2 hours by hand shaking. The product was substantially pure tribasic lead sulphate monohydrate.

EXAMPLE 8

30 g of lead monoxide was shaken with 4.5 g of ammonium sulphate and 100 ml of 0.890 aqueous ammonia. After 2 hours partial conversion to tribasic lead sulphate monohydrate had occurred. After standing for 48 hours the conversion was substantially complete.

It is to be understood that many modifications can be made to the described embodiment without departing from the spirit and scope of the present invention.

I claim:

1. A process for the production of tribasic lead sulphate monohydrate comprising reacting lead sulphate with a reagent selected from the group consisting of aqueous ammonia, mixtures of aqueous ammonia and solid ammonium sulphate, and solutions containing aqueous ammonia and ammonium sulphate, the reagent containing a minimum of 0.24 ml 35% aqueous ammonia per gram of lead sulphate, and the temperature of the reaction being maintained between ambient and 200°C, with agitation.

2. A process according to claim 1 wherein the temperature is maintained between ambient and 40°C.

3. A process according to claim 2 wherein the agitation is provided for 0.25 to 5 hours.

* * * * *